(12) United States Patent  (10) Patent No.: US 8,771,820 B1
Goodspeed  (45) Date of Patent: Jul. 8, 2014

(54) GLOVE SAVER

(76) Inventor: Ginger L. Goodspeed, Portland, OR (US)

( * ) Notice: Subject to any disclaimer, the term of this patent is extended or adjusted under 35 U.S.C. 154(b) by 368 days.

(21) Appl. No.: 13/164,549

(22) Filed: Jun. 20, 2011

(51) Int. Cl.
  *B32B 3/00* (2006.01)
  *B32B 3/06* (2006.01)
(52) U.S. Cl.
  USPC ............. 428/99; 156/349; 428/98; 428/100; 428/109
(58) Field of Classification Search
  USPC ...................... 428/99, 98, 100, 109
  See application file for complete search history.

(56) References Cited

U.S. PATENT DOCUMENTS 5,605,729 A * 2/1997 Mody et al. ............. 428/37
6,195,803 B1 * 3/2001 Russell et al. ........... 2/161.1

* cited by examiner

*Primary Examiner* — Brent O'Hern
(74) *Attorney, Agent, or Firm* — Brian C. Trask

(57) ABSTRACT

A patch that can be affixed to handwear, such as a glove, to extend the life of the glove by providing a wear-resistant surface. An operable patch can repair one or more hole in the glove, and/or provide a primary wear surface disposed over the glove's conventional exterior surface. A preferred patch includes an adhesive layer that bonds the patch to the handwear. A bead of adhesive, such as cyanoacrylate, can be added to the perimeter of the patch for additional security of installation. A preferred wear-resistant surface is formed by a drapable layer carrying a plurality of fibrous loop structures on one side. Certain embodiments are structured to permit a user to make a tool-free repair of handwear in the field.

17 Claims, 4 Drawing Sheets

GLOVE SAVER

BACKGROUND

1. Field of the Invention

This invention relates generally to articles of clothing, and particularly to handwear, such as gloves, mittens, and the like.

2. State of the Art

The gloves used in many sports, such as lacrosse and hockey, wear very quickly on the inside of the fingers and palm, depending upon where the sports equipment used to play the game produces friction and wear. While the outside of the lacrosse and hockey gloves (e.g. the back of the fingers and hand) remain in good condition for an extended period of time, the inside or palm area, typically made from synthetic materials such as synthetic suede and nylon mesh combinations, or leather in the case of hockey gloves, tends to wear very quickly, exposing holes and leaving the player's hand unprotected from the friction of the stick. Players may wear out the palms of relatively expensive lacrosse or hockey gloves in as little as 2 months. Usually made from a combination of synthetic suede and nylon mesh, the palms of many commercially available gloves are not as durable as is generally desirable.

Sports Rule Books state that players with holes in their gloves are deemed to have Illegal Equipment, and they are penalized, which could affect the outcome of the game. In addition, the illegal equipment is not allowed to return to the game unless it has been repaired. The National Federation of State High Schools Association (NFHS) creates the rules for all high school sports. In regards to Lacrosse, the Rule Book states: Palmless or fingerless gloves are illegal, whether bought that way or made that way through play use or by the player. As such, a 3 minute penalty is imposed on a player with illegal gloves, and the player may only return to the game with a legal pair of gloves. This penalty means the team is one man down during that time, which could affect the outcome of the game. If a player does not have a second legal pair of gloves with them, which is entirely possible as the holes may have just occurred in the gloves, (s)he may potentially have to remain out of the game altogether. It is in the interest of the coaches and players to be properly protected, which is why there are rules that govern the safety of gloves in athletic use.

Many associations have similar rules regarding gloves, as they are protective equipment used by players in many sports. NCAA Official Lacrosse Rules include:

Personal Equipment

SECTION 21. a. Protective Equipment. All players shall wear protective gloves, shoes and jerseys. All players except the designated goalkeeper shall wear shoulder pads and arm pads. The designated goalkeeper shall wear protective goalkeeper equipment (see Rule 1-23-c). The altering of equipment is prohibited. All players on a team must wear gloves of the same dominant official team color unless safety reasons require a different color glove to be worn.

Use of Illegal Equipment

SECTION 6. A player may not use equipment that does not conform to specifications. The fingers and/or palms may not be cut out of the gloves by the player or during the manufacturing process, nor may the gloves and shoulder pads be altered in a way that compromises their protective features. Use of illegal equipment other than an illegal crosse is a nonreleasable foul. (See Rule 5-5 for illegal crosse.)

A.R. 11. Before a game, officials should make themselves available to clarify any questions concerning the legality of any equipment. Once the game begins, it is the officials' responsibility to enforce this rule—coaches may not request to have their team's gloves inspected, and officials shall not warn players.

NLL (National League Lacrosse) Official Rules Include:

Rule 33: Protective Equipment/Pads 33.1 REQUIRED EQUIPMENT LIST—All players are required to wear a protective helmet, facemask and chinstrap. Players must wear protective gloves, shoulder/vest pads and rib pads. Failure to conform shall result in removal from the floor. Returning to the floor for the second violation in the game will result in a bench minor delay of game penalty. The offending player serves penalty.

Hockey has Very Similar Rules to Lacrosse. The USA Hockey Rules Include:

Rule 304—Protective Equipment (a) Each participant is personally responsible to wear protective equipment for all games, warm-ups and practices. Such equipment should include gloves, shin pads, shoulder pads, elbow pads, hip pads or padded hockey pants, protective cup, tendon pads plus all head protective equipment as required by USA Hockey rules. It is recommended that all protective equipment be designed specifically for ice hockey.

Rule 305—Dangerous Equipment (b) A glove from which all or part of the palm has been removed or cut to permit the use of the bare hand shall be considered illegal equipment. A misconduct penalty shall be imposed on any player wearing such a glove in play. (Note) Players, including goalkeepers, violating this rule shall not be permitted to participate in the game until such equipment has been corrected or removed.

Rule 404—Misconduct Penalties (a) A "MISCONDUCT" penalty involves the removal of a player, other than a goalkeeper, from the game for a period of 10 minutes . . . .

AAU USA (InLine Hockey Association) Rules State:

Rule 3.05—Dangerous Equipment:

(b) A glove from which all or part of the palm has been removed or cut to permit the use of bare fingers shall be considered illegal equipment. If any player wears such a glove in play, a minor penalty shall be imposed on that player.

It can be seen that various sport activities, which require participants to use protective handwear, have been in existence for many years. Certain handwear is expensive, and not particularly durable. Rules of play often define a certain level of protection that must be provided by handwear used in play of certain games. Even after persistence of such conditions for many years, still handwear does not provide a sufficient level of durability, and is subject to developing one or more hole during play. There is a long-felt, and unsolved, need for a product operable to extend the useful life of such handwear. There is also a long-felt, and unsolved, need for a product that may be used to effect a legal repair of such handwear substantially in real-time, without requiring use of tools, and on (or near) the field of play. It would constitute a significant improvement to provide such a product.

BRIEF SUMMARY OF THE INVENTION

Certain preferred embodiments of the invention provide a wear-resistant patch for handwear, a method for repairing handwear using the patch, and/or a pre-assembled kit including the patch. An exemplary patch includes a planar substrate having a first side, a second side, and being bounded by a perimeter. A typical patch is structured to drape over a portion of the 3-dimensional conventional exterior surface of handwear to form a wear-resistant working surface that is conformingly disposed in proximity to the handwear's conventional exterior surface.

Sometimes, the first side of a patch carries an adhesive layer that is adapted to adhere to the exterior surface of handwear. The surface of the second side desirably includes, or is made from, a wear-resistant material. In some embodiments, the second side carries a plurality of loops such as are present on one side of a hook-and-loop fastener. In certain currently preferred embodiments, the first side carries an adhesive layer that is adapted to adhere to handwear, and the second side carries a plurality of loops. It is within contemplation that a patch structured according to certain principles of the invention may be attached to the exterior surface of certain handwear by sewing, or using alternative manufacturing techniques.

Patches may be shaped and sized differently for different particular applications. One exemplary patch is adapted to be cut down to a desired size by a consumer. Another patch is structured to drape over substantially the entire palm area of handwear. A further patch is structured to drape over the thumb tip of handwear. A still further patch is structured to drape over a portion of a digit of handwear.

A patch can be used in a method for extending the life of handwear, such as a glove, or mitten, and the like. One such method includes the step of providing a patch that is structured as previously described, and affixing the patch onto the exterior surface of handwear. The affixing step may include adhering the first side to a portion of the exterior surface of handwear. The method may further include disposing a bead of adhesive onto the first side and substantially around the perimeter. In the latter case, a currently preferred adhesive is cyanoacrylate.

The method may further include, prior to the affixing step, removing a peel-off backing from the first side, and/or cutting the patch down to a desired size. In some cases, the affixing step includes sewing the patch to handwear. Sometimes, a manufacturer of handwear may sew a patch in place during manufacture of the handwear. Other times, a consumer may sew a patch onto pre-manufactured handwear.

The invention may also be embodied as a prefabricated kit for extending the life of handwear. One such kit includes a patch structured substantially as disclosed above, a quantity of cyanoacrylate adhesive; and a printed instruction set detailing steps for a user to take to effect installation of the patch onto handwear. Typically, one step set forth in the instruction set includes placing a bead of cyanoacrylate adhesive around the perimeter of the patch prior to adhering the patch to the exterior surface of handwear.

BRIEF DESCRIPTION OF THE DRAWINGS

In the drawings, which illustrate what are currently considered to be the best modes for carrying out the invention.

DETAILED DESCRIPTION OF THE ILLUSTRATED EMBODIMENTS

Reference will now be made to the drawings in which the various elements of the illustrated embodiments will be given numerical designations and in which the invention will be discussed so as to enable one skilled in the art to make and use the invention. It is to be understood that the following description is only exemplary of the principles of the present invention, and should not be viewed as narrowing the claims which follow.

In one aspect, the invention may be embodied as one or more wear-resistant patch that can be applied to a high-wear area of handwear. In certain embodiments, patches structured according to certain principles of the invention form protective reinforcements for sports gloves. Embodiments may be stitched into place during the manufacturing process; applied to new gloves; or applied to used gloves with existing holes; thereby increasing the durability and life of the glove. Applying preferred embodiments, whether during the manufacturing process by stitching, or otherwise adhering, or by the consumer as a separate purchase for new or existing gloves, strengthens the inside of the glove on high-wear areas, such as the palm, fingers and thumb, and slows the wearing process significantly. Certain preferred embodiments may be removed, and replaced by unused embodiments, to further extend the life of the handwear.

Figure 1:
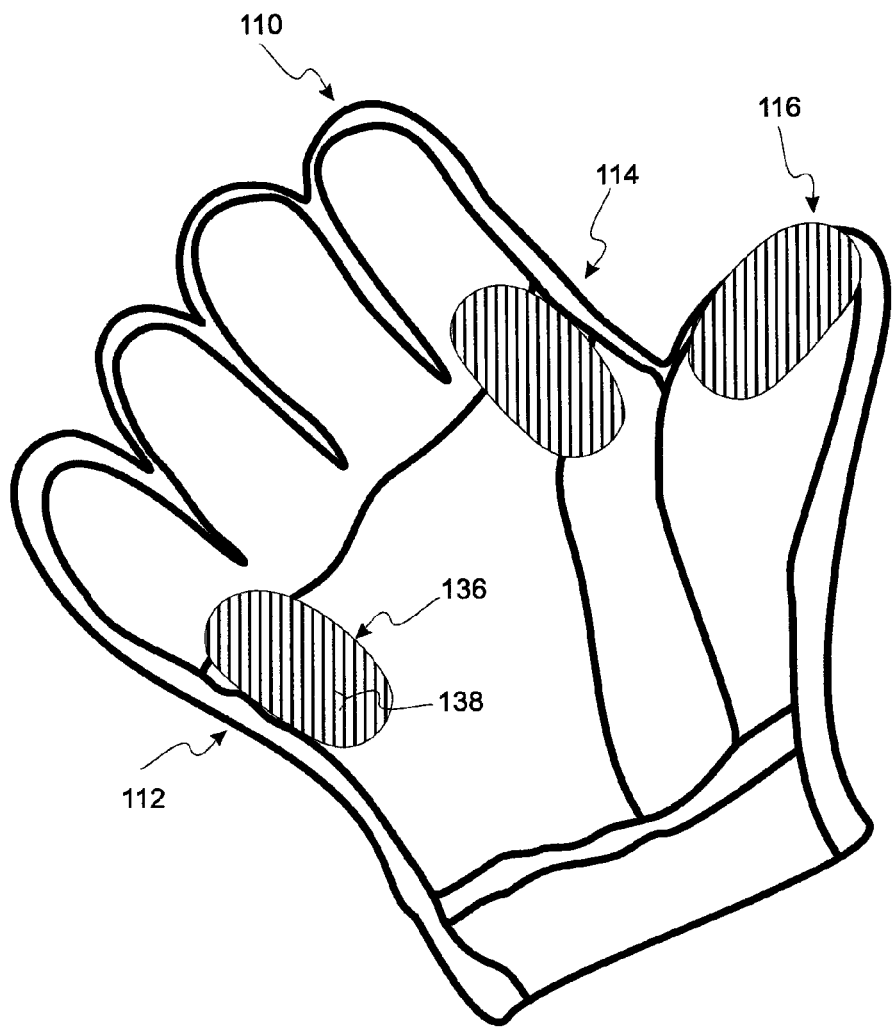
FIG. 1 is a plan view of a right-hand glove of the type used in certain sports events, and carrying embodiments structured according to certain aspects of the instant invention.

With reference to FIG. 1, several embodiments structured according to certain principles of the invention are shown associated with a sports glove, generally 110. Embodiments may be regarded as forming wear-resistant patches. In general, such a patch may be structured to drape over a portion of the 3-dimensional conventional exterior surface of handwear to form a wear-resistant working surface that is conformingly disposed in proximity to the handwear's conventional exterior surface. A first embodiment 112 is adapted for disposition on the pinky-side of a palm surface of the glove 110. A second embodiment 114 is adapted for disposition on the thumb-side of that palm surface. A third embodiment 116 is adapted for disposition onto the thumb of the glove 110.

Each of embodiments 112, 114, and 116 may be differently sized and shaped, or may have a common shape and/or size. An alternatively shaped patch 118 (see FIG. 2) is particularly configured to drape over the thumb shaft and tip area of a glove 110. Patch 120 is a larger size compared to patch 112, and may be applied over a larger worn area, or to protect a larger area from wear. Similarly, patch 130 in FIG. 3 may be applied over substantially the entire palm area of a glove 110. It can be seen, therefore, that patches according to certain principles of the invention may be manufactured in a variety of shapes and sizes, as required for a particular application. It is further within contemplation that a consumer may cut down a patch from a first large size and shape to a second, smaller desired size and shape. It should also be noted that, although illustrated patches are for a right-hand glove, patches having minor images may be used comparably on a left-hand glove.

As exemplified in FIG. 1, embodiments may be adhered to the three general locations on each players' glove where the shaft of a lacrosse stick rubs directly against the glove. Patches used in a lacrosse application are typically affixed to the thumb and across the palm areas where the shaft of a lacrosse stick rubs directly against the glove. Application of embodiments in substantially real-time, in the field of play, or near the field of play, may be made to effect a legal repair of a hole that can occur because wear-resistant embodiments were not applied to the gloves when new, or when the glove was manufactured. Desirably, certain embodiments of a workable patch may be installed in a tool-free operation.

Figure 2:
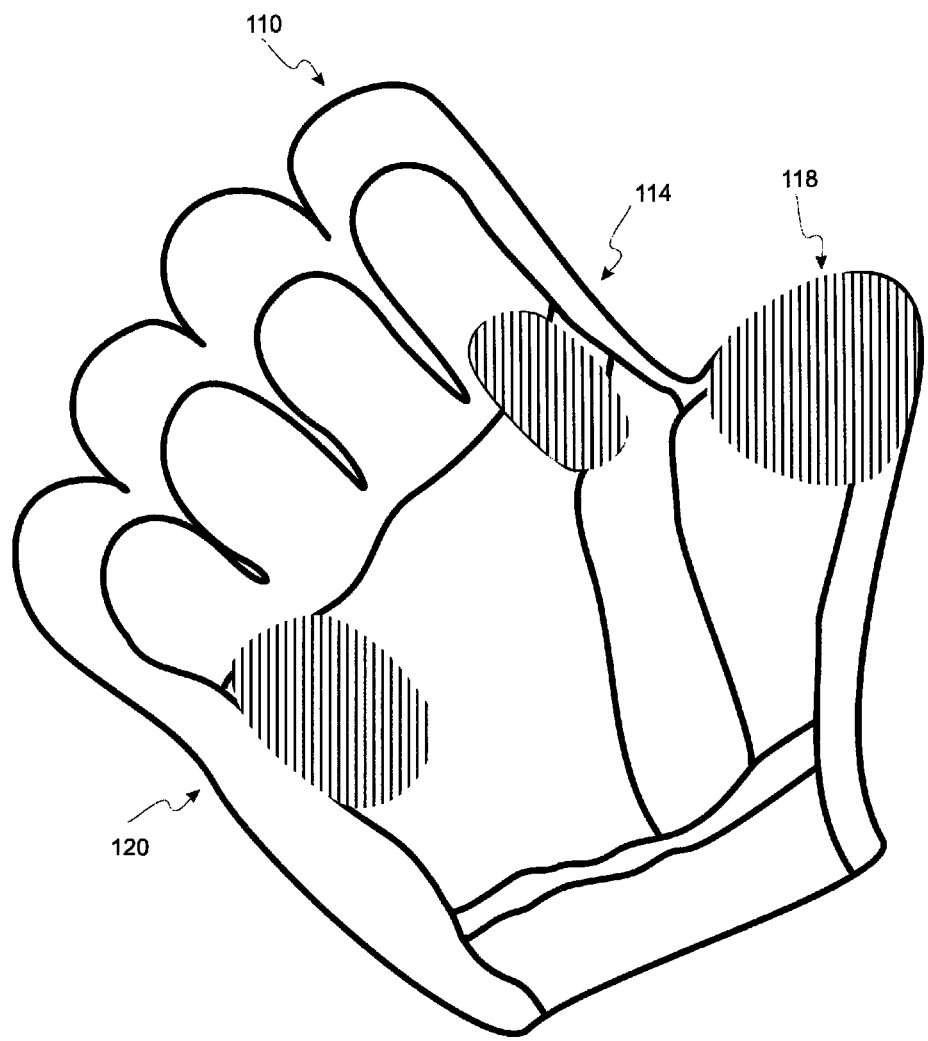
FIG. 2 is a plan view of a right-hand glove of the type used in certain sports events, and carrying alternatively configured embodiments structured according to certain aspects of the instant invention.
Figure 3:
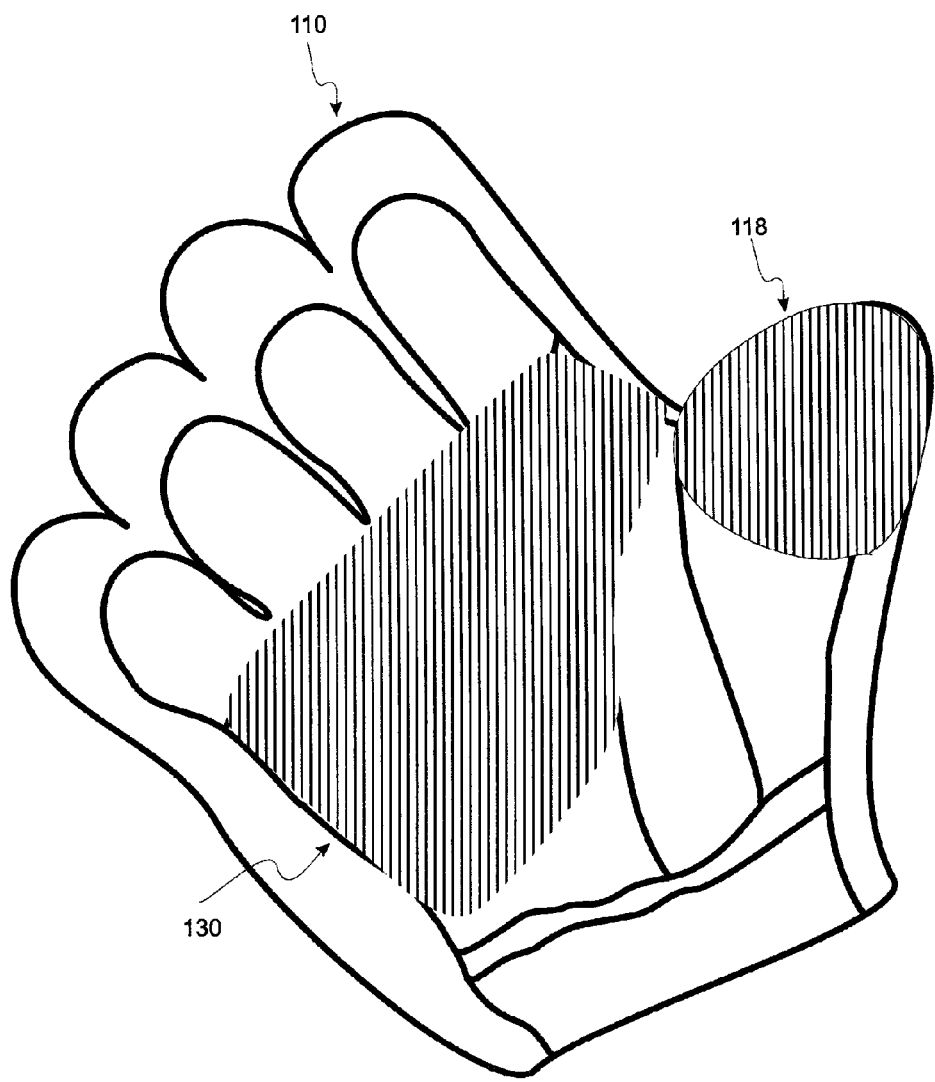
FIG. 3 is a plan view of a right-hand glove of the type used in certain sports events, and carrying other alternatively configured embodiments structured according to certain aspects of the instant invention.
Figure 4:
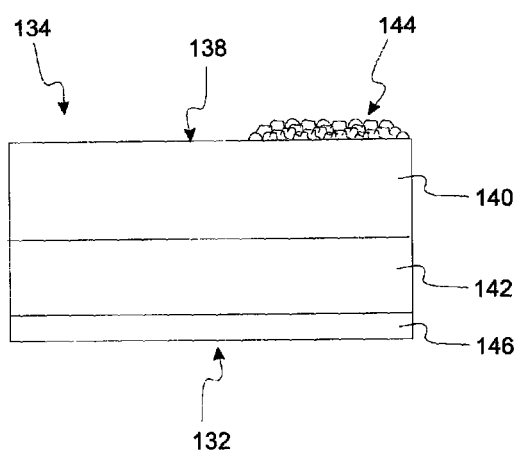
FIG. 4 is a cross-section taken through a representative embodiment.

With reference to FIGS. 1, 2 and 4, an exemplary patch 112 includes a planar substrate having a first side 132, a second side 134, and being bounded by a perimeter 136 that defines rounded corners. Desirably, the surface 138 of second side 134 includes, or may be formed from, a wear-resistant material. In FIG. 1, after installation on a glove, the entirety of exposed surface 138 consists essentially of a wear-resistant material that forms a working surface. Patches according to the instant invention may be made from a variety of substrates that have been field tested and shown to increase both the durability and wearability of gloves. The substrate 140 in FIG. 4 is desirably drapable, to compliantly conform to the working surface of a glove on which the patch is installed, so that the patch maintains a "feel" for the wearer with respect to an implement, such as a lacrosse stick. Certain embodiments of the invention may actually improve a players "feel" and/or manipulation of the implement. In contrast, a piece of tape, such as Duct tape, sometimes used for quick repair, does not have the durability or wearability of a currently preferred embodiment. Nor does it aid in performance.

A substrate 140 may optionally carry an adhesive layer 142. A workable adhesive layer may be formed from a rubber-based adhesive available from 3M™, which can be laminated to the substrate to form a pressure-sensitive adhering surface. Such an adhesive adheres substantially instantly upon on application to the glove. An alternative workable adhesive includes an acrylic-based adhesive, such as 3M 9472 or 3M 9474 Acrylic Transfer Tape. One such acrylic-based adhesive requires about 24 hours to set subsequent to installation of a patch onto a glove. However, certain acrylic adhesives are made to adhere with initial high tack and long term adhesion, as opposed to certain rubber-based versions which have high initial tack, but also a tendency to lift due to the difference in surface energy. The 3M adhesives may be laminated directly onto the substrate materials, so the die cutting process typically used to form a patch is performed on one single product.

Sometimes, a substrate 140 may carry, or otherwise include, surface structure, such as fibrous loops generally indicated at 144. An exemplary laminated adhesive layer is typically about 0.005 0.0067 inch in thickness. The Velcro™ or Duragrip™ fabrics generally have a thickness of about 0.025 inches, while the Denier 920 thickness is approximately 0.005 inches. A die-cut patch 136 made from Velcro™ will have a working surface 138 consisting of the loop-portion of a hook-and-loop fastener.

The particular substrate for each application is typically determined based on the application the gloves are commonly suited for, as well as the substrate from which the glove is manufactured. Substrates include, but are not limited to, a fabric similar in nature to Velcro™, as well as Velcro™, and a fabric similar in nature to Denier 920, which is a fabric designed for durability and outdoor equipment use. Currently preferred materials of construction for a patch embodiment include Duragrip Loop PS-R, Velcro Industrial Strength Loop PS-15, and Denier 920 (or above) nylon fabric. Operable substrate materials are available from Fastech of Jacksonville, PO Box 11838, Jacksonville, Fla. 32239, having a website at www.hookandloop.com; and Rose City Textiles, 2515 NW Nicolai St., Portland, Oreg. 97210-1814, having a website at www.rosecitytextiles.com.

Appropriate substrates are generally used without an adhesive when stitched in during a glove's manufacturing process, although use of adhesive in combination with stitching is also workable. For consumer end use, they are typically laminated with an adhesive layer 142 having a peel-off backing 146 which allows for quick application of a patch by a consumer. Therefore, the entirety of one side of that installed patch is adhered to the glove. Sometimes, the adhesion is subject to lifting as a result of sweat or a difference in the surface energy of the glove and the repair patch. Therefore, the consumer may sometimes seal and/or repair a perimeter edge bond with an additional adhesive, such as cyanoacrylate.

A tube of adhesive, such as cyanoacrylate, may be included in the product packaging of an exemplary repair kit, to keep the edges secure on the substrate(s) to which the wear-resistant patches are adhered. Typically, such a kit would also include a printed instruction set detailing steps for a user to take to effect installation of a patch onto handwear. In such case, one step set forth in the instruction set may include placing a bead of cyanoacrylate adhesive around the patch's perimeter prior to adhering the patch to the exterior surface of a glove.

The size of the wear-resistant patches is typically determined separately for each product, often specific to the size and usage of the glove to which it will be applied, either during the manufacturing process or by a consumer. Wear-resistant patches can be die-cut from the substrate. The size of certain wear-resistant patches purchased by consumers may sometimes be cut down as desired by a consumer in order to repair a particular size of hole.

Preferred embodiments of the invention have been deemed a legal form of repair by the US Lacrosse Association Official. They can be applied quickly to cover existing holes, and a player may return to the field with his gloves being legal after one or more embodiment has/have been applied. This is considered a repair to the glove, rather than an alteration, which is why it is a legal way to repair holes and make the gloves legal. These embodiments are proving successful commercially, as previously there was not a solution for repairing or extending the life of gloves, particularly in the sports of hockey or lacrosse.

While currently preferred embodiments structured according to certain aspects of the invention were originally developed for sport gloves of the type typically used in Lacrosse and Hockey, they are not limited to these two sports. Embodiments may be applied to any glove in need of repair, or to extend the life of any new gloves including: gloves for sports, including but not limited to snowboarding, wakeboarding, waterskiing, skiing, cross-country skiing, roping, horseback riding, bull riding, baseball, softball, golf, motorcycle riding, dirtbike riding, NASCAR and any type of car or cart racing, cycling, bicycle riding, rugby, football, rope climbing, rock climbing, weight lifting, hiking, racquetball, tennis and so forth. Embodiments may also be applied to gloves or handwear for other general uses that wear or have holes in them, such as any gloves used to protect the hand. Examples include leather, cotton or synthetic fiber gloves. Useful applications may be, but are not limited to, gloves worn for cold temperatures; for working in oilfields; for working in mines; for milking cows or other farm-related activities; for irrigation; for gardening; for industrial purposes; and other related or unrelated activities where gloves provide protection to the palm, thumb and fingers of the hand.

While the invention has been described in particular with reference to certain illustrated embodiments, such is not intended to limit the scope of the invention. The present invention may be embodied in other specific forms without departing from its spirit or essential characteristics. The described embodiments are to be considered as generally illustrative and not restrictive. The scope of the invention is, therefore, indicated by the appended claims rather than by the foregoing description. All changes which come within the meaning and range of equivalency of the claims are to be embraced within their scope.

What is claimed is:

1. The combination of a Lacrosse glove or a Hockey glove and a patch for that glove, the patch comprising:
   a planar substrate having a first side, a second side, and being bounded by a perimeter that defines rounded corners, said second side consisting essentially of a wear-resistant material including a plurality of loops disposed to protrude from attachment to, and distributed over, said second side, wherein:
   said patch is installed on said glove to drape over a portion of a 3-dimensional conventional exterior surface of said glove to expose the entirety of said second side as a wear-resistant working surface that is conformingly disposed in proximity to said conventional exterior surface.

2. The combination according to claim 1, wherein:
   said first side carries an adhesive layer that is adapted to adhere the entirety of said first side to said exterior surface.

3. The combination according to claim 1, wherein:
   said second side consists of the loop-portion of a hook-and-loop fastener.

4. The combination according to claim 1, wherein:
   said first side carries an adhesive layer that is adapted to adhere the entirety of said first side to said exterior surface; and
   said second side consists of the loop-portion of a hook-and-loop fastener.

5. The combination according to claim 1, wherein:
   said patch is adapted to be attached to said conventional exterior surface by sewing.

6. The combination according to claim 1, wherein:
   said patch is adapted to be cut down to a desired size by a consumer.

7. The combination according to claim 1, wherein:
   said patch is structured to drape over substantially an entire palm area of said handwear.

8. The combination according to claim 1, wherein:
   said patch is structured to drape over a thumb tip of said handwear.

9. The combination according to claim 1, wherein:
   said patch is structured to drape over a portion of a digit of said handwear.

10. A method for extending the life of a Lacrosse or Hockey glove, comprising:
    providing a patch comprising a planar substrate having a first side, a second side, and being bounded by a perimeter that defines rounded corners, said second side consisting essentially of a wear-resistant material including a plurality of loops disposed to protrude from attachment to, and distributed over, said second side; and
    affixing said patch to said glove to drape over a portion of a 3-dimensional conventional exterior surface of said glove to expose the entirety of said second side as a wear-resistant working surface that is conformingly disposed in proximity to said conventional exterior surface.

11. The method according to claim 10, wherein:
    said affixing step comprises adhering said first side to a portion of said exterior surface.

12. The method according to claim 11, further comprising:
    prior to said affixing step, removing a peel-off backing from said first side.

13. The method according to claim 11, further comprising:
    disposing a bead of adhesive onto said first side and substantially around said perimeter.

14. The method according to claim 11, further comprising:
    prior to said affixing step, cutting said patch down to a desired size.

15. The method according to claim 12, further comprising:
    placing a bead of adhesive substantially around said perimeter for disposition of said adhesive between said first side and said exterior surface.

16. The method according to claim 15, wherein:
    said adhesive is cyanoacrylate.

17. The method according to claim 10, wherein:
    said affixing step comprises sewing said patch to said handwear.

* * * * *